United States Patent Office 2,877,230
Patented Mar. 10, 1959

2,877,230

PYRROCOLINE DYES

Robert S. Long, Bound Brook, and Richard J. Boyle, Neshanic, N. J., assignors to American Cyanamid Company, New York, N. Y., a corporation of Maine No Drawing. Application September 18, 1957
Serial No. 684,646

3 Claims. (Cl. 260—295)

This invention relates to new red pigments of the phthaloyl pyrrocoline carboxamide type and, more specifically, to compounds of the formula:

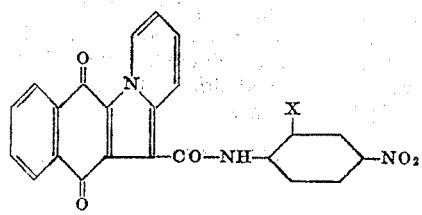

in which X may be chlorine, lower alkoxy, lower alkyl, and nitro.

Compounds of this type are referred to as aromatic amides of 2,3-phthaloylpyrrocoline-1-carboxylic acids. They may also be referred to as naphtho (2,3-b) pyrrocoline-6,11-dione derivatives. However, for convienience, the phthaloylpyrrocoline designation is used in this specification.

Red organic pigments of good fastness are difficult to obtain. In the past, various azo compounds have been used to obtain red shades, especially where organic pigments are desired. Azo compounds, however, lack, as a general rule, the extreme fastness properties required for pigments. Consequently, fading has been a pronounced defect in the red pigments heretofore obtainable. The alternative of using various vat dyes as pigments is not a satisfactory substitute since the available red shades of vat dye which possess good pigmentary properties are not competitive in brightness with the azo compounds. There is thus a big need for red pigments with the brightness of azo compounds and the fastness of the anthraquinone pigments.

We have found that certain arylides of 2,3-phthaloylpyrrocoline-1-carboxylic acid, namely those of the structure:

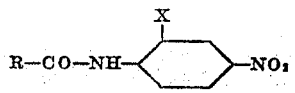

in which R—CO— represents the above acyl radical and in which X may be Cl, lower alkoxy, lower alkyl, or $NO_2$, are excellent red pigments of considerable brightness and surprisingly high degree of light fastness.

It is most surprising that these pigments should be bright reds since the unsubstituted anilide is a violet which is lacking in brightness. In addition, the unsubstituted anilide is lacking in fastness to light and it is surprising that the introduction of a nitro group has such a marked effect on the fastness and other pigmentary properties. Even other amides which have a reddish self shade, such as naphthylamides, are not satisfactory pigments.

Previously, 2,3-phthaloylpyrrocoline-1-carboxylic acid, its unsubstituted amide and its esters had been prepared (Pratt, Luckenbaugh and Erickson, Journal of Organic Chemistry, 19, 176–182, 1954). However, these compounds are not useful as pigments and because of their undesirable properties there could be no indication that by replacing the ester of unsubstituted amide groups with a nitro-aromatic amide group, such excellent pigments could be obtained.

By varying the substituents on the amide group within the indicated limits, a variety of shades of reds may be obtained. The pigments of the present invention have excellent properties and show desirable bright red shades of excellent fastness. An especially surprising property is their striking fastness to light, all the more unexpected since the corresponding simple phthaloylpyrrocoline-1-carboxylic anilide does not have this property.

A convenient method for the preparation of the pigments of our invention involves the use, as a starting material, of the acid chloride of 2,3-phthaloylpyrrocoline-1-carboxylic acid. This chloride may be prepared by the method of Pratt et al. The arylides are obtained by reaction of the acid chloride with the desired aromatic amine. The aromatic amines which are used are all nitroanilines, there being specifically used, 2-chloro-4-nitroaniline, 2-methoxy-4-nitroaniline, 2-methyl-4-nitroaniline, 2,4-dinitroaniline, 2-ethyl-4-nitroaniline and 2-ethoxy-4-nitroaniline. The presence of lower alkoxy and alkyl groups in the nitroaniline is particularly advantageous. In general, these further substituted nitro anilides have more attractive shades, improved fastness and appreciably greater tinctorial strength.

The Pratt method of preparing the pyrrocoline carboxylic esters involves the condensation of dichloronaphthoquinone with ethyl acetoacetate in the presence of pyridine:

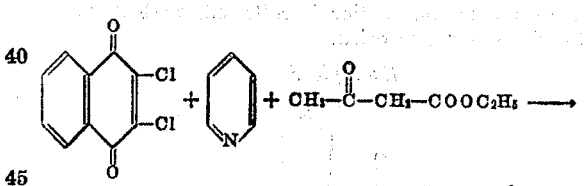

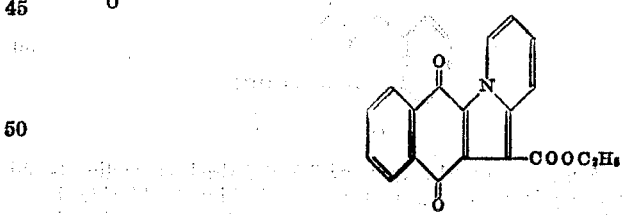

The esters of the phthaloylpyrrocoline carboxylic acid formed by this first step, are then converted to the arylides by conversion through the carboxylic acid to the acid chloride and reaction with the desired aromatic amine.

For the preparation of the aromatic amides, the acid chloride of the 2,3-phthaloylpyrrocoline-1-carboxylic acid is heated with the aromatic amine in an organic solvent; o-dichlorobenzene is an example of an especially useful solvent for this purpose. On cooling, the reaction product is isolated by ordinary means. An alternative method is to react the acid directly with the amine according to known procedures using a compound such as phosphorus trichloride as condensing agent.

This application is a continuation-in-part of our copending application, Serial No. 512,888, filed June 2, 1955, now abandoned.

The invention may be further illustrated by the following examples:

Example 1

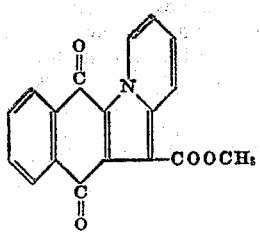

A mixture of 100 parts of methyl acetoacetate, 123 parts of pyridine, 80 parts of anhydrous alcohol and 40 parts of 2,3-dichloro-1,4-naphthoquinone is heated to the reflux temperature, with stirring, until the reaction is substantially complete. After cooling, the precipitated solid is collected by filtration and washed thoroughly with ethanol; the product which is obtained is purified by recrystallization from glacial acetic acid.

Example 2

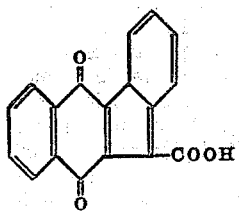

To 120 parts of ethanol is added 12 parts of 1-carbomethoxy-2,3-phthaloylpyrrocoline. The mixture is stirred and heated, and to the hot slurry is slowly added 20 parts of 5 N sodium hydroxide solution. After stirring at the reflux temperature for a short time, the solid sodium salt which precipitates is isolated by filtration. This is stirred with boiling acetic acid and the product which precipitates on cooling is collected, washed thoroughly with water, and dried.

Example 3

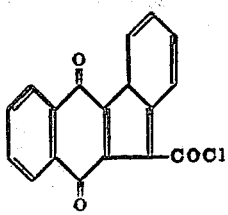

A mixture of 61.2 parts of 2,3-phthaloylpyrrocoline-1-carboxylic acid and 640 parts of thionyl chloride is stirred at the reflux temperature until the reaction is substantially complete. After cooling, the solid material is removed by filtration and washed thoroughly with light petroleum ether. After drying the acid chloride is obtained as an orange solid.

Example 4

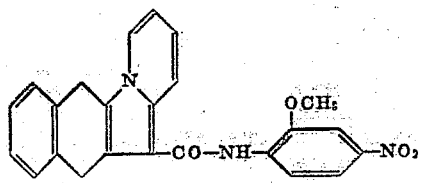

A mixture of 7.74 parts of 2,3-phthaloylpyrrocoline-carbonyl chloride, 8.4 parts of 4-nitro-o-anisidine and 130 parts of o-dichlorobenzene is stirred at the reflux temperature until the reaction is substantially complete. After cooling, the precipitated solid is removed by filtration, washed thoroughly with alcohol, then with hot water and finally again with alcohol. After drying the product is obtained as a red colored solid. It may be purified by recrystallization from o-dichlorobenzene. When an equivalent quantity of 4-nitro-2-ethoxy aniline is used in place of the nitroanisidine the corresponding 4-nitro-2-ethoxy aniline is obtained.

Example 5

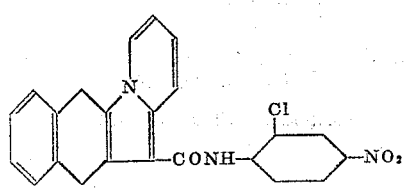

A mixture of 13.6 parts of the carboxylic acid chloride of Example 3 and 960 parts of o-dichlorobenzene is heated to reflux. There is then added 7.6 parts of 2-chloro-4-nitroaniline and the mixture is held at reflux until the reaction is substantially complete. The mixture is cooled to 60° C. and filtered. The solid product is washed with alcohol and dried. It can be recrystallized from trichlorobenzene.

Example 6

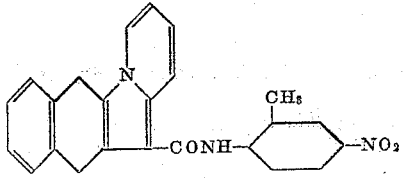

A mixture of 15.05 parts of the acid chloride of Example 3 and 720 parts of o-dichlorobenzene is heated to reflux and 7.42 parts of 2-methyl-4-nitroaniline is added. The mixture is held at reflux until the reaction is substantially complete and is then cooled to 60°. The solid product is isolated by filtration, washed with alcohol and dried. It can be recrystallized from trichlorobenzene.

A similar product is obtained by using an equivalent quantity of 2-ethyl-4-nitroaniline in place of the methyl-nitroaniline.

Example 7

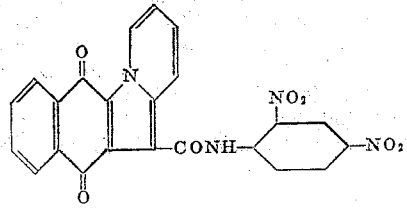

The procedure of Example 4 is followed using an equivalent quantity of 2,4-dinitroaniline in place of the nitroanisidine.

Example 8

Samples of the nitroanilides of phthaloylpyrrocoline carboxylic acid of this invention are tested as pigments versus phthaloylpyrrocoline carboxanilide similarly prepared from aniline. The testing is carried out by mulling 0.5 g. of the pigment with 0.8 g. of an organic vehicle under pressure. Rubouts of these dispersions give direct color comparisons as print tones. The addition of one part of such dispersion to 100 parts of titanium dioxide paste gives a comparison in a tint. These rubouts are submitted to fadeometer testing for 150 hours for light fastness. The results are as follows:

| Amide | Print Tone | | Tint Tone | |
| --- | --- | --- | --- | --- |
| | Shade | Fastness | Shade | Fastness |
| Anilide | standard (dull violet). | moderate fading. | standard (violet gray). | modertte fading. |
| 4-Nitro-2-anisidide | much redder | trace of fading | very much redder and brighter. | no change. |
| 4-Nitro-o-toluidide | very much redder | ___do___ | ___do___ | Do. |
| 4-Nitro-2-chloroanilide | very much brighter and redder. | no change | ___do___ | Do. |

We claim:
1. The 2-chloro-4-nitroanilide of 2,3-phthaloylpyrrocoline-1-carboxylic acid.
2. The 2-methoxy-4-nitroanilide of 2,3-phthaloylpyrrocoline-1-carboxylic acid.
3. The 2-methyl-4-nitroanilide of 2,3-phthaloylpyrrocoline-1-carboxylic acid.

References Cited in the file of this patent

UNITED STATES PATENTS

| | | |
| --- | --- | --- |
| 2,772,274 | Schmidt-Nickels et al. | Nov. 27, 1956 |
| 2,773,873 | Schmidt-Nickels et al. | Dec. 11, 1956 |